US006895391B1

(12) United States Patent
Kausik

(10) Patent No.: US 6,895,391 B1
(45) Date of Patent: May 17, 2005

(54) METHOD AND SYSTEM FOR SECURE AUTHENTICATED PAYMENT ON A COMPUTER NETWORK

(75) Inventor: Balas N. Kausik, Los Gatos, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/437,065

(22) Filed: Nov. 9, 1999

(51) Int. Cl.[7] .................................................. G06F 17/60

(52) U.S. Cl. ........................... 705/50; 705/51; 705/713; 705/171; 705/200; 705/201; 705/380; 705/228; 705/278; 705/283

(58) Field of Search ............................. 705/50, 51, 75, 705/76; 713/200, 201, 171, 156, 157, 173, 175; 380/228, 278, 283

(56) References Cited

U.S. PATENT DOCUMENTS 5,511,122 A 4/1996 Atkinson
5,590,197 A 12/1996 Chen et al.
5,815,657 A 9/1998 Williams et al.
5,850,442 A 12/1998 Muftic
5,883,810 A 3/1999 Franklin et al. ....... 364/479.02
6,000,832 A 12/1999 Franklin et al. ....... 364/479.02
6,061,791 A * 5/2000 Moreau ...................... 713/171
6,098,053 A * 8/2000 Slater .......................... 705/44

FOREIGN PATENT DOCUMENTS

JP 410135943 A * 5/1998
WO WO 99/49424 9/1999
WO WO 00/75749 A2 12/2000
WO WO 00/75843 A1 12/2000

* cited by examiner

*Primary Examiner*—Elisca Pierre Eddy
(74) *Attorney, Agent, or Firm*—Townsend and Townsend and Crew, LLP

(57) ABSTRACT

A simple, secure and easy-to-deploy method and system for authenticating credit and debit cardholders at the point-of-sale on a computer network (e.g. the Internet) is disclosed. Cardholders are authenticated using digital signatures on a sales draft, in a manner that does not necessarily require any changes in the transaction flow of the participating financial institutions.

51 Claims, 5 Drawing Sheets

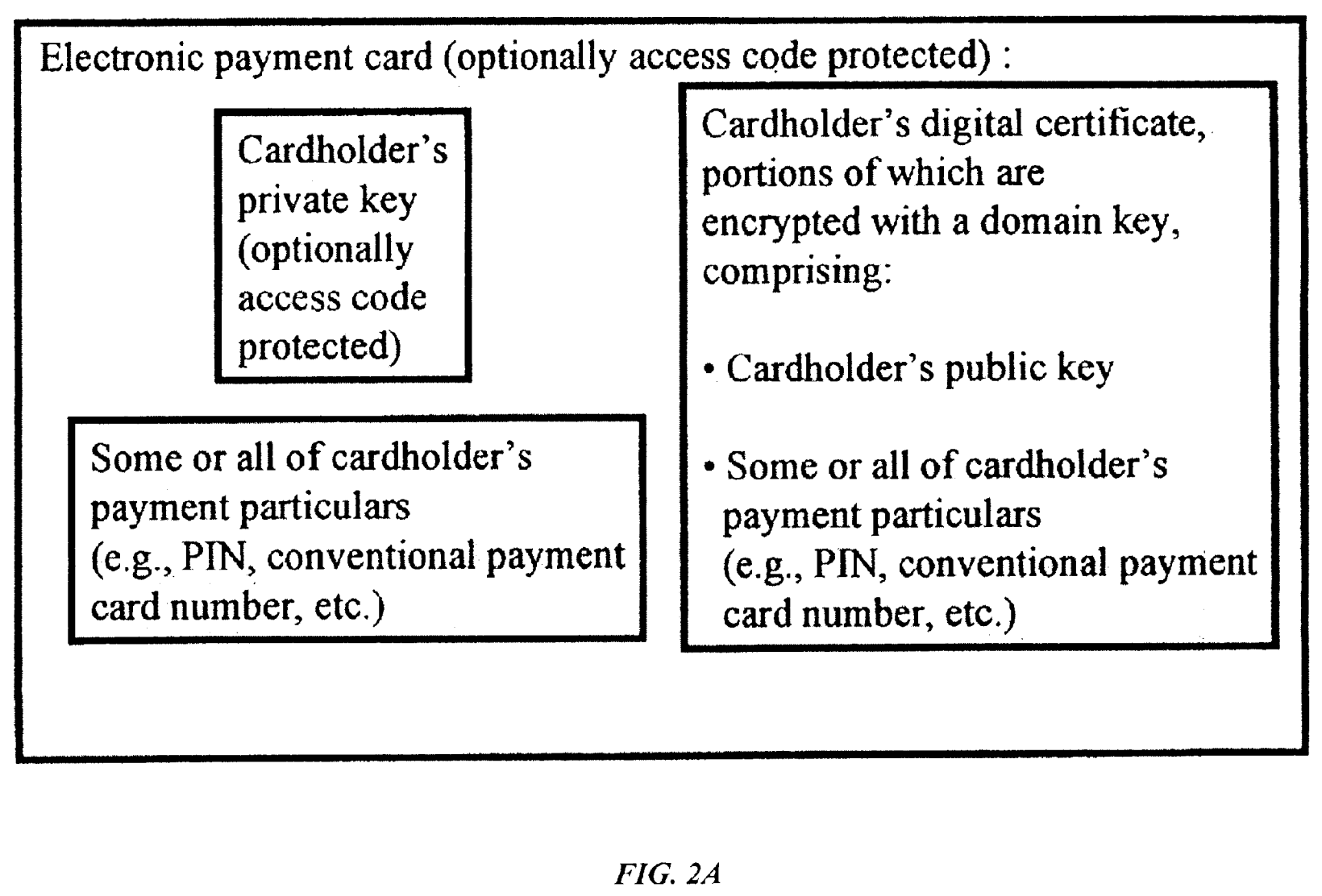

Electronic payment card (optionally access code protected) :

Cardholder's private key (optionally access code protected)

Some or all of cardholder's payment particulars (e.g., PIN, conventional payment card number, etc.)

Cardholder's digital certificate, portions of which are encrypted with a domain key, comprising:

- Cardholder's public key
- Some or all of cardholder's payment particulars (e.g., PIN, conventional payment card number, etc.)

*FIG. 2A*

METHOD AND SYSTEM FOR SECURE AUTHENTICATED PAYMENT ON A COMPUTER NETWORK

FIELD OF THE INVENTION

The present invention relates to a method and system for secure authenticated payment at a point-of-sale on a computer network. More particularly, the present invention allows the use of digital signatures on a sales draft to authenticate purchasers in a manner that does not necessarily require any changes in the transaction processing of the financial institutions participating in the transaction.

BACKGROUND OF THE INVENTION

In present electronic commerce transactions, buyers may pay for goods and services by presenting the seller with a payment card number, e.g., a conventional credit card number. Because the buyer and seller are connected solely through a computer network (e.g., the Internet), it is not possible for the buyer to authenticate himself as the legitimate cardholder, nor can the buyer sign the sales draft. Thus, the seller honors any valid credit card number that is presented, creating a large opportunity for fraud.

Worse yet, other forms of payment such as debit cards are not presently viable on computer networks. Debit cards require the cardholder to enter a personal identification number ("PIN"), which is used to authenticate the transaction to the cardholder's bank. However, entering a simple PIN on a networked computer poses a substantial security risk—if the PIN and the debit-card number fell into the wrong hands, the cardholder's bank account would be completely compromised.

Thus, with respect to both conventional credit and debit cards, authenticating a cardholder on the network with a solution that is simple, secure, and easy to deploy remains an important unsolved problem.

Digital signature technology offers one means of authenticating the cardholder with a high degree of security. In this technology, each cardholder owns a pair of keys—a signature (private) key and a verification (public) key. The cardholder signs a transaction with his private key, and then sends the transaction, the digital signature, and (optionally) his public key to the merchant. The merchant forwards these items to the bank (or other financial institution), and the bank honors the transaction if the cardholder's public key verifies the cardholder's digital signature.

One security advantage of digital signatures is that the private key of the cardholder typically remains in possession (or at least control) of the cardholder. Thus, there is no inherent risk associated with a transaction that would compromise future transactions. One disadvantage of the digital signature method described above is that banks and transaction processors would have to change their existing infrastructure to allow digital signatures to flow through their networks. This infrastructure change would basically require a substantial overhaul of the present electronic banking and transaction processing system, which is costly and difficult to achieve.

Thus, there is a need for a method and system that offers the security advantages of digital signatures without necessarily requiring significant changes in the banking and processing network.

SUMMARY OF THE INVENTION

One embodiment of the present invention includes a simple, secure and easy-to-deploy method and system for authenticating credit and/or debit cardholders at a point-of-sale on a computer network (e.g., the Internet). Cardholders are authenticated using digital signatures on a sales draft, in a manner that does not necessarily require any changes in the transaction process of the financial institutions participating in the transaction.

In this embodiment of the system, the cardholder enrolls for an electronic payment card (either an electronic debit or credit card) at a participating financial institution by visiting its issuer proxy enrollment site, e.g., a web site hosted by an issuer proxy computer associated with the financial institution. At the enrollment site, the cardholder types in his particulars, such as his conventional payment card number, conventional payment card PIN, name, address, etc. The cardholder also (optionally) selects a password (access code) for his electronic payment card that is preferably unrelated to the PIN for his conventional payment card. The issuer proxy generates a public key-private key pair for use by the cardholder if the cardholder does not already have such a pair. The issuer proxy binds the cardholder's public key and some or all of the cardholder's payment particulars in a digital certificate using an encryption key (called a domain key) that is shared between the issuer proxy and a bridge computer. Such a domain key will allow the bridge computer to confirm the issuer's certification during a subsequent authorization stage, described below. The cardholder then receives a piece of software that is downloaded to his computer containing his particulars in encrypted form. This piece of software constitutes the cardholder's electronic payment card. It comprises (or is configured to obtain and use) the cardholder's private key, which is (optionally) protected by the password, and the corresponding public-key digital certificate containing the cardholder's payment particulars.

Thenceforth, as the cardholder shops online, he can elect to pay via electronic payment. To do so, the cardholder activates his electronic payment card with the previously selected password. The cardholder's electronic payment card software interacts with corresponding software at the online merchant to digitally sign the sales draft created during the transaction with the cardholder's private key. The merchant then sends the signed sales draft and the cardholder's digital certificate to the bridge computer for processing. The bridge computer uses the cardholder's digital certificate to check the digital signature on the sales draft. If the signature is valid, the bridge computer creates a conventional debit or credit transaction to be processed by the banking and transaction network. The particulars needed for creating the conventional transaction, such as the conventional card number and PIN, are extracted and decrypted from the cardholder's digital certificate using the private key associated with the domain key (if the digital certificate was asymmetrically encrypted) or the domain key itself (if the digital certificate was symmetrically encrypted). The embodiment of the invention described above provides one or more or the following advantages:

(1) Additional hardware at the cardholder's computer is not necessarily required for deployment. This is in marked contrast to hardware tokens such as smart cards, where cards and card readers are required. Of course, the software comprising the cardholder's electronic payment card can be stored on smart cards, as well as virtually any other storage medium, including, without limitation, floppy disks, hard drives, and magnetic stripe cards;

(2) Changes are not necessarily required in the existing banking network;

(3) Administrative overhead is low. The cardholder can enroll at any participating financial institution that offers the service, not necessarily the one that issued the cardholder's conventional payment card. Furthermore, enrollment can be on a self-serve basis and does not necessarily require activation mailings by the financial institutions;

(4) Electronic payment cards can be deployed rapidly, because they are intuitive to use and require little user or administrator training; and/or (5) Security can be enhanced via special techniques such as "cryptographic camouflaging," which is commercially available from Arcot Systems, Inc.

The foregoing and other embodiments and aspects of the present invention will become apparent to those skilled in the art in view of the subsequent detailed description of the invention taken together with the accompanying figures and appended claims.

BRIEF DESCRIPTION OF THE DRAWINGS

FIG. 2A illustrates an exemplary electronic payment card created using the preferred embodiment of the invention.

DETAILED DESCRIPTION OF THE INVENTION

Figure 1:
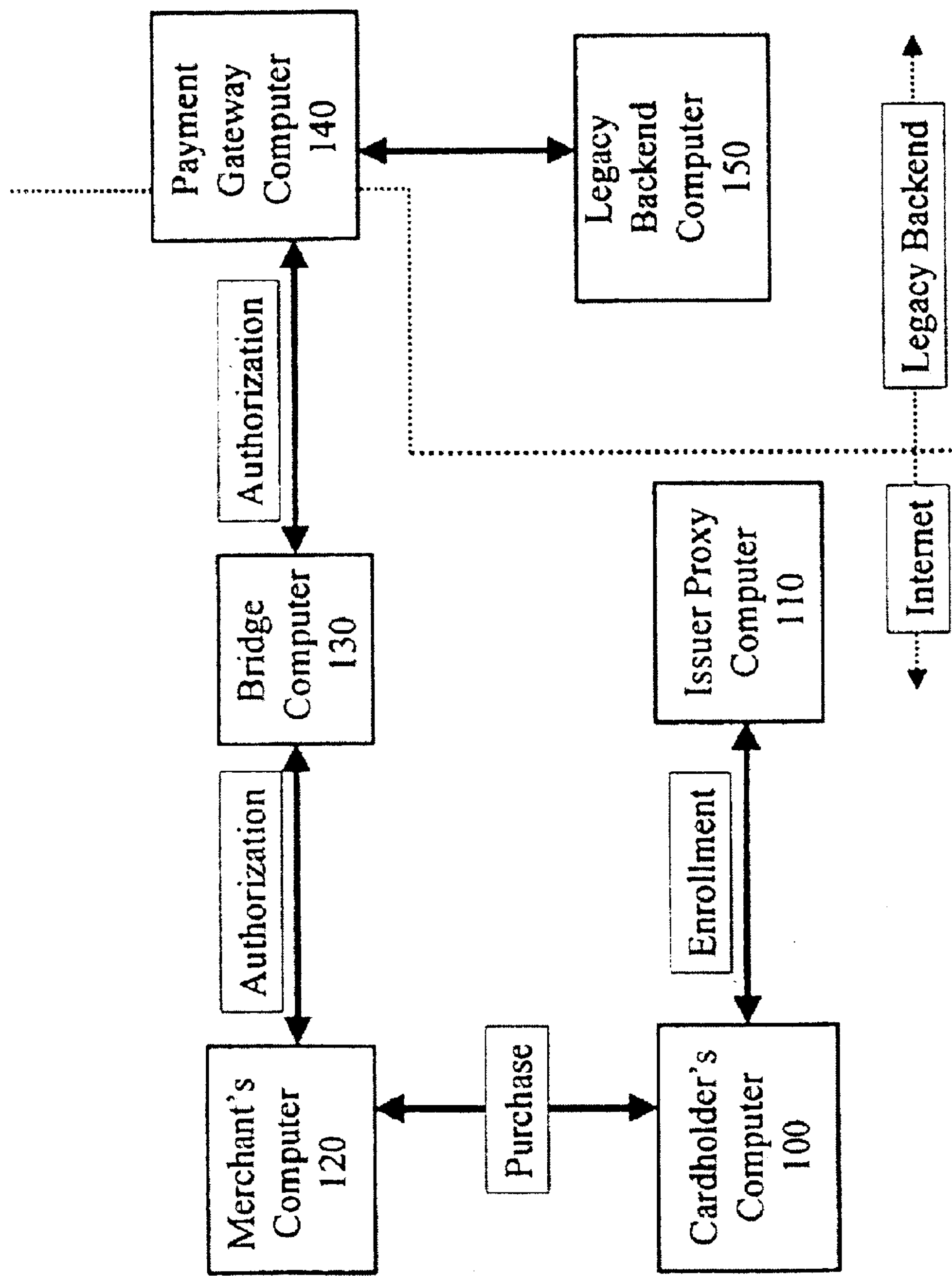
FIG. 1 is a block diagram illustrating an exemplary computer system for secure authenticated payment on a computer network.

FIG. 1 is a block diagram illustrating an exemplary computer system for secure authenticated payment on a computer network (e.g., the Internet). The system contemplates a network of computers including a cardholder's computer 100, a payment card issuer's proxy computer 110, a merchant's computer 120, a bridge computer 130, a payment gateway computer 140, and legacy backend computer 150. In this exemplary embodiment, the network is deployed over the Internet, although those skilled in the art will recognize that any public or private communication network including, without limitation, extranets, intranets, and other telephonic or radio communications networks could also be used. Similarly, as used herein, the term computer refers to any device that processes information using an integrated circuit chip, including without limitation mainframe computers, work stations, servers, desktop computers, portable computers, embedded computers, and hand-held computers.

Enrollment

Figure 2:
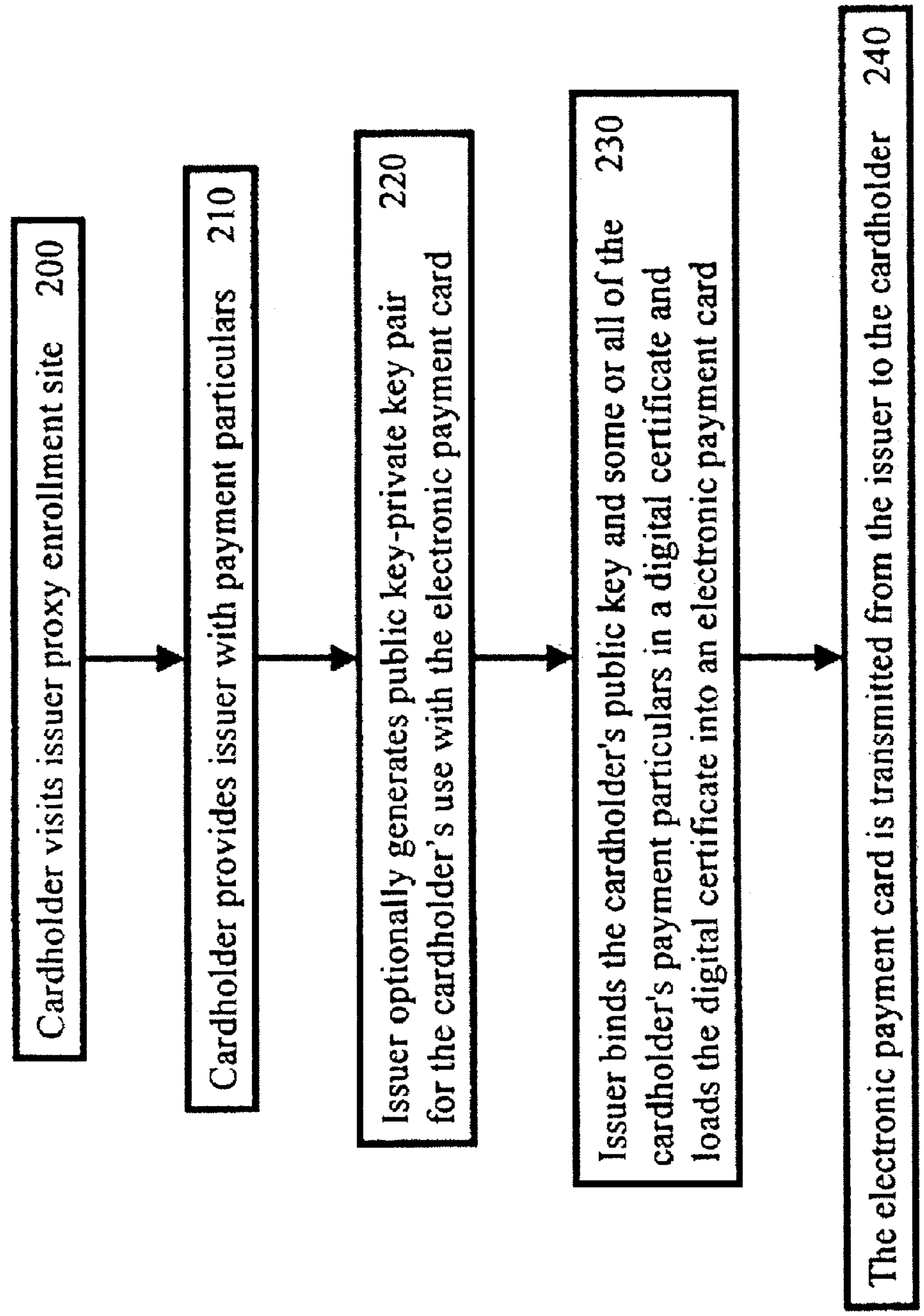
FIG. 2 is a flow chart illustrating an exemplary method for cardholder enrollment for an electronic payment card.

Referring now to FIG. 2, at step 200, a cardholder (user) at computer 100 enrolls for an electronic payment card (either an electronic debit card or an electronic credit card) at the electronic payment card issuer proxy 110, typically by visiting the website of a participating financial institution on the Internet. At step 210, the cardholder provides the issuer 110 with particular information used to make a payment (payment particulars), such as his conventional payment card number, conventional payment card PIN, conventional credit card holder verification value 2 ("CVV2"), conventional cardholder name and address, or any other cardholder identification information. The issuer proxy 110 can be operated by any trusted financial institution that participates in the electronic payment system, not necessarily the financial institution that issued the cardholder's conventional payment card.

The issuer proxy 110 can optionally verify the cardholder's payment information by any of the means available for such verification including, without limitation, creating a payment transaction in the conventional payment network. Such a transaction could be "authorization only" in the sense that it would be used only for verifying the cardholder's payment particulars, with no money actually transferred.

At step 220, the issuer 110 generates a public key-private key pair for the cardholder to use in connection with the electronic payment system. If the cardholder already has a public key-private key pair that he wishes to use in connection with the electronic payment system, he provides his public key to the issuer 110. The cardholder's private key is typically stored on the cardholder's computer 100, often under the control of a PIN or other form of access code (password). The access code can be protected against unauthorized detection using commercially available software technology such as software smart cards from Arcot Systems, Inc., described in "Software Smart Cards via Cryptographic Camouflage," Proceedings IEEE Symposium on Security and Privacy, May 1999, and in co-pending U.S. patent application Ser. No. 08/996,758, "Method and Apparatus for Secure Cryptographic Key Storage Certification and Use," which is incorporated herein by reference.

The access code may also be protected against unauthorized detection (e.g., so-called "shoulder surfing") using the technology described in co-pending U.S. patent application Ser. No. 09/249,043, "Method and Apparatus for Secure Entry of Access Codes in a Computer Environment," which is incorporated herein by reference.

At step 230, the issuer 110 binds the cardholder's public key and some or all of the cardholder's payment particulars in a digital certificate, typically by encrypting the cardholder's public key and particular identifying information provided by the cardholder. The encryption key used for encrypting the cardholder's payment particulars—called the domain key—is typically shared between the issuer proxy 110 and the bridge computer 130, and may be either a symmetric key or an asymmetric encryption key. In one embodiment, the domain key may be a public key associated with the bridge computer 130, so that only the bridge computer 130 can decrypt the encrypted cardholder particulars (using a corresponding private key associated with the bridge computer 130). In another embodiment, the domain key may be a symmetric encryption key that is shared by the issuer proxy 110 and the bridge computer 130. In either case, the bridge computer will use the domain key (actually, its private key counterpart, if asymmetric; or the domain key itself, if symmetric) to verify the binding, as will be described later in the section entitled "Authorization." After the issuer proxy 110 combines the cardholder's public key with some or all of the cardholder's payment information and digitally signs the combination to create a digital certificate for the cardholder, the digital certificate for the cardholder is loaded into an electronic payment card for the cardholder. Of course, those skilled in the art will realize that many other types of binding can be used including, without limitation, offloading the signing to a trusted third party, or receiving (rather than creating) the digital certificate from the user (although such binding is less secure).

At step 240, the issuer 110 sends and the cardholder's computer 100 receives the cardholder's electronic payment card, e.g., a piece of software that is downloaded to the cardholder's computer 100. The electronic payment card (typically stored in a software wallet) may be further protected against unauthorized access via a PIN (preferably different from the PIN associated with the cardholder's conventional payment card) or other form of user access code. The access code may be protected against unauthorized detection by the above-mentioned procedures used to protect the private key PIN. (Indeed, if the two PINs are the same, private key access for digitally signing and electronic payment card access for transaction execution could be accessed via a single protocol.) Setting the access code (PIN) for the electronic payment card is preferably done when the electronic payment card is being created by the issuer 110, but can also be done separately, e.g., when the cardholder first accesses his electronic payment card on the cardholder computer 100.

Alternatively, if the cardholder wishes to be able to perform electronic transactions from a variety of locations, the cardholder's private key and/or electronic payment card may be stored at a credential server and downloaded on the fly by a roaming cardholder using a shared secret or challenge-response protocol. In the latter case, commercially available software such as Arcot WebFort from Arcot Systems, Inc., described at http://www.arcot.com/products.html and in co-pending U.S. patent application Ser. No. 09/196,430, "Method and Apparatus for Secure Distribution of Authentication Credentials to Roaming Users," which is hereby incorporated by reference, may be used to effect the roaming functionality.

One advantage of this enrollment process is that the issuer's participation can be passive, in that the issuer proxy 110 can be operated by any trusted financial institution that participates in the electronic payment system, and is not necessarily the bank or financial institution that issued the conventional payment card to the cardholder. This is important because it suffices that one well-recognized financial institution participates in the system. Furthermore, even the participation of this financial institution can be limited to establishing the issuer proxy 110 on the network for self-service access by the cardholder, and does not require mailings to the cardholder, or other physical interaction with the cardholder.

FIG. 2A illustrates an exemplary electronic payment card created using the preferred embodiment of the invention, in which the card contains: (a) the cardholder's digital certificate, comprising the cardholder's payment particulars, and his public key, portions of which are encrypted under the domain key; and (b) the cardholder's private key.

Figure 3:
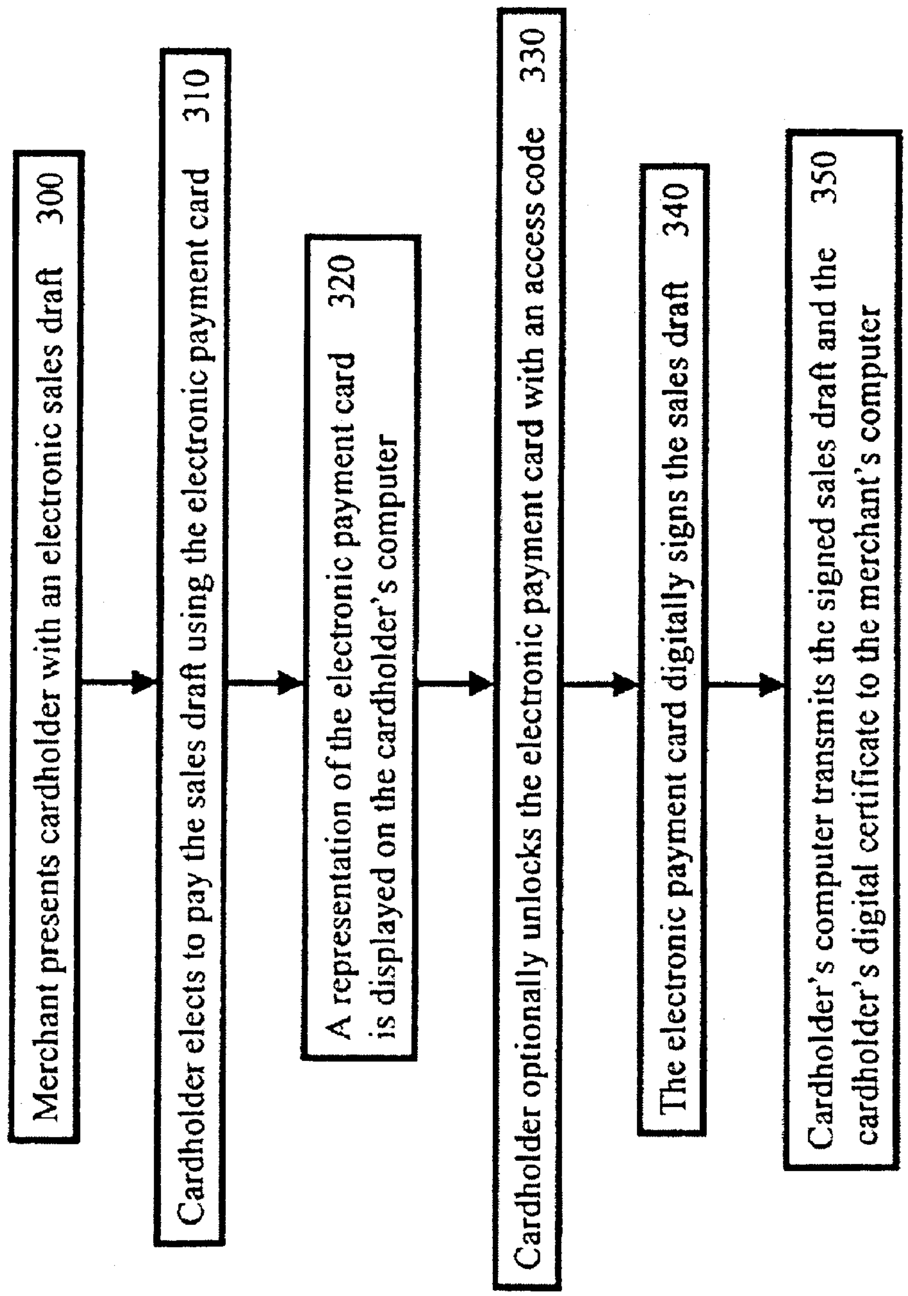
FIG. 3 is a flow chart illustrating an exemplary method for point-of-sale interaction between a cardholder and a merchant.

Point-Of-Sale Transaction Between a Cardholder and a Merchant on the Computer Network A cardholder uses his computer 100 to shop at a merchant's website at merchant's computer 120. Referring now to FIG. 3, at step 300, when the cardholder decides what goods or services he wants to buy, the merchant presents the cardholder with an electronic sales draft.

At step 310, the cardholder elects to pay the sales draft using the cardholder's electronic payment card. At step 320, a representation of the cardholder's electronic payment card may be displayed on the cardholder's computer 100. If the cardholder chose to protect his electronic payment card with an access code, then at step 330 the cardholder unlocks and activates his electronic payment card. If the electronic payment card is protected with an access code, then the electronic payment card cannot be activated unless the correct access code is entered. The access code can be stored in a variety of locations including, without limitation, the cardholder's own memory, or a floppy disk, magnetic stripe card, smart card, or disk drive coupled to the cardholder's computer 100. At step 340, the cardholder's (activated) electronic payment card digitally signs the electronic sales draft that was presented to the cardholder in step 300 using the cardholder's private key. Optionally, the cardholder's electronic payment card can automatically fill in the information used by the sales draft. At step 350, the cardholder's computer 100 sends the digitally signed sales draft and the cardholder's digital certificate to the merchant's computer 120, where it is received by the merchant's computer 120.

Authorization

Figure 4:
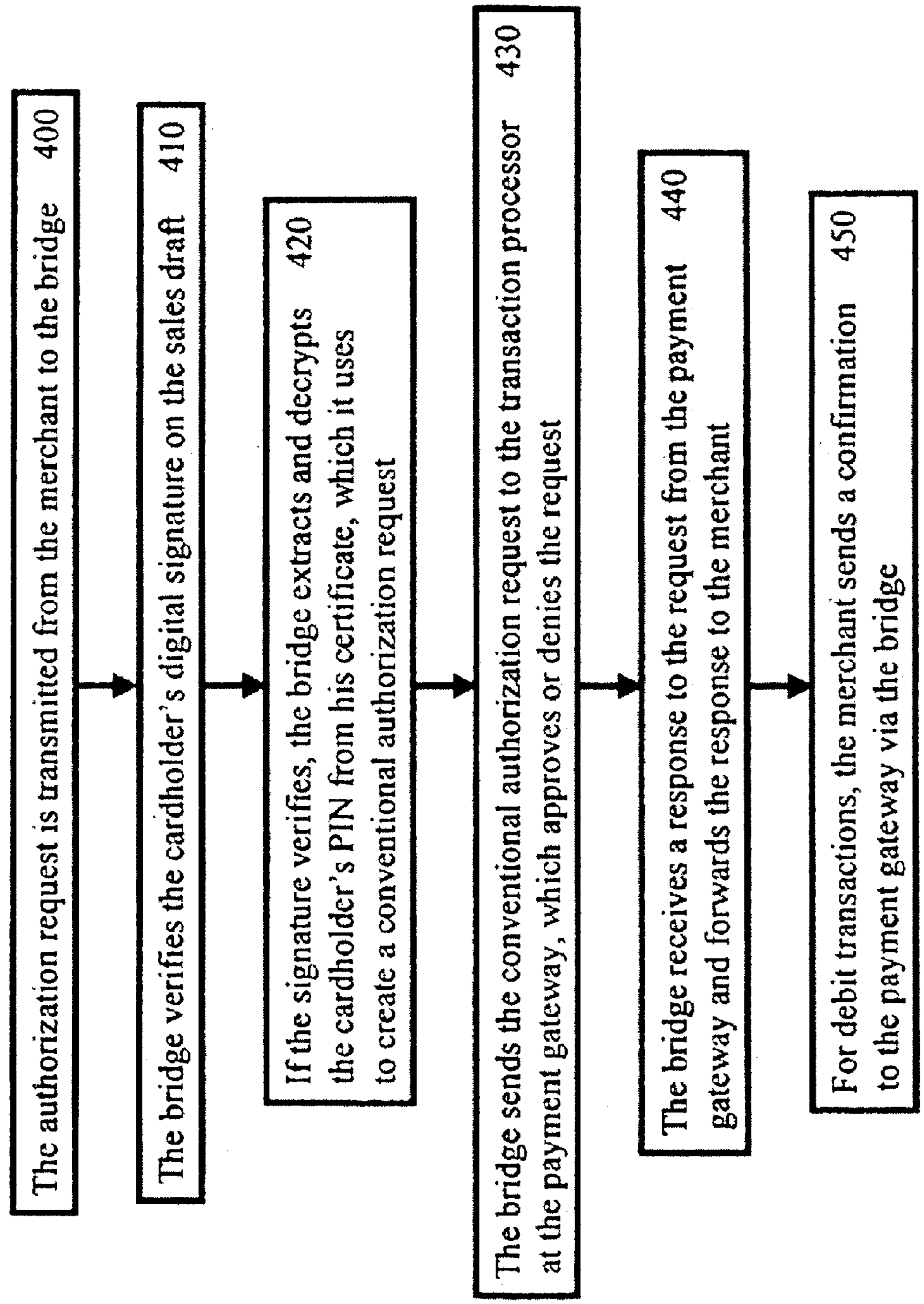
FIG. 4 is a flow chart illustrating an exemplary method for a merchant to obtain authorization for the payment transaction.

Referring now to FIG. 4, at step 400, the merchant's computer 120 sends, and the bridge computer 130 receives, an authorization request from the merchant (seller). The authorization request includes the electronic sales draft with the cardholder's (buyer's) electronic signature and the cardholder's digital certificate. As mentioned above, in one embodiment of the invention, the cardholder's digital certificate includes the cardholder's verification key (public key) and an encrypted version of the cardholder's PIN for his conventional payment card.

At step 410, the bridge computer 130 uses the cardholder's verification key to confirm (verify) that the cardholder's electronic signature on the sales draft was authorized by the cardholder (buyer). If the electronic signature is confirmed, then at step 420 the bridge computer 130 extracts the encrypted version of the cardholder's PIN for his conventional payment card from the cardholder's digital certificate and decrypts the PIN using the private key associated with the domain key (if the PIN was asymmetrically encrypted) or the domain key itself (if the PIN was symmetrically encrypted). In this (or in some equivalent) fashion, the bridge computer 130 can verify the binding (of the payment particulars and the user's public key) that was performed by the issuer 110. The bridge computer 130 uses the decrypted PIN to generate a conventional authorization request as is well-known to those skilled in the art of payment card transaction processing (see, e.g., Visa International Acquirer Services External Interface Specification, Apr. 1, 1999, EIS 1080 Version 5.8, available from Visa). The decrypted PIN may be re-encrypted with a key that is shared by the bridge computer 130 and the transaction processor at payment gateway 140. Certain other particulars that are typically used for creating a conventional authorization request, such as the conventional payment card number, conventional credit card holder verification value 2 ("CVV2"), conventional cardholder name and address, or any other cardholder identification information, may also be extracted and decrypted from the cardholder's digital certificate.

Note that some types of conventional payment transactions do not necessarily use PINs, e.g., some conventional credit card transactions. For these transactions, after the bridge computer 130 verifies the cardholder's digital signature on the sales draft at step 410, the bridge computer 130 generates a conventional authorization request at step 420 without performing the PIN extraction and PIN decryption steps.

At step 430, the bridge computer 130 sends the conventional authorization request to the transaction processor at payment gateway 140. Using the information provided in the authorization request, the payment gateway 140 approves or denies the request and sends its authorization response back to the bridge computer 130.

In an alternative embodiment of the invention, the bridge computer 130 can be integrated into the payment gateway 140. Indeed, any combination of issuer proxy 110, bridge computer 130, and/or payment gateway 140 can be integrated together.

The bridge computer 130 receives from the payment gateway 140 either an approval or a disapproval of the authorization request. In either event, at step 440, the bridge computer 130 forwards the authorization response (approval or disapproval) to the merchant (seller) at the merchant's computer 120.

If the cardholder is making a debit transaction, then at step 450 the merchant's computer 120 sends a confirmation to the payment gateway 140 via the bridge computer 130.

One advantage of this authorization process is that there is minimal impact on the merchant. Another advantage is that the payment gateway 140 can interact with the legacy back-end systems 150 using conventional transaction processing methods. In other words, no changes are necessarily required to the back-end infrastructure.

In an alternate embodiment of the system, the bridge computer 130 can act in "stand-in" mode. Specifically, some financial institutions may choose not to receive the decrypted PIN from the cardholder's digital certificate, relying instead on the bridge computer's assertion that the cardholder's signature verified correctly. If the cardholder PIN was also verified at the issuer proxy 110 during enrollment, the risk of a fraudulent transaction may be deemed low. In such situations, the bridge computer 130 would assemble and transmit an authorization request without a PIN to the transaction processor at payment gateway 140.

In yet another embodiment of the system, the merchant can store a copy of the digital signature of the cardholder along with the sales draft. The bridge computer 130 would process the transaction assuming that the digital signature of the cardholder is valid. In the event that the cardholder disputes the transaction, the merchant must present the stored copy of the sales draft and the cardholder's digital signature. The bridge computer 130 will verify the digital signature and, on the basis of the verification, determine whether the merchant should refund the amount of the transaction. An advantage of this embodiment is that the computational processing required at the bridge computer 130 is reduced. However, the merchant faces an increased risk of fraud.

In yet another embodiment of the system, a user who does not have a conventional credit or debit card (or who wants to get additional conventional payment cards), can be given the option of signing up for a conventional payment card during the electronic payment card enrollment process. The conventional payment card number that is given to this user can then be incorporated into the user's electronic payment card.

In yet another embodiment of the system, a user may choose to enroll his checking account to an electronic payment credential, rather than a debit or credit card. The user would identify himself via a variety of means at enrollment time, or may be given an activation code by his bank that he would use to identify himself for enrollment.

Although the preferred embodiments of this invention create an electronic payment card for conventional debit or credit cards or conventional checking accounts, the present invention enables a bridge to network payment for almost any conventional transaction system. For example, the present invention could also be used for secure electronic bill payment, person-to-person transactions, and electronic auction settlements.

The software described herein, for use by the various computers, is conveniently implemented using C, C++, Java, Javascript, HTML, or XML, running on Windows, Windows NT, Solaris, Unix, Linux, or Macintosh operating systems on virtually any computer platform. Moreover, those skilled in the art will readily appreciate that such software can be implemented using virtually any programming language, running on virtually any operating system on any computer platform.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A method for authenticating an electronic payment comprising:

receiving from a seller an electronic sales draft including an electronic signature, said electronic sales draft being digitally signed using a private key associated with a public key;

receiving from said seller a digital certificate associated with a buyer, said digital certificate including a first verification key and an encrypted version of a personal identification number (PIN), said digital certificate including a binding between at least a portion of said financial account datum and said public key using a second verification key associated with a trusted party performing said binding;

using said first verification key to verify that said electronic signature was authorized by said buyer;

extracting said encrypted version of said PIN from said digital certificate;

decrypting said encrypted version of said PIN using said second verification key or a key associated with said second verification key, thereby verifying said first verification key was bound using said second verification key by said trusted party that performed said binding;

generating, using said PIN, an authorization request; sending said authorization request to a financial institution; receiving an approval of said authorization request from said financial institution; and sending said approval to said seller.

2. A method for authorizing an electronic purchase in a networked computer environment, comprising the steps of:

(a) receiving, from a merchant, a transaction authorization request including a digital certificate passed through said merchant from a user involved in said transaction and a transaction order that was digitally signed by said user using a private key associated with a public key, (i) said digital certificate including a financial account datum associated with said user as well as said public key of said user, (ii) said digital certificate also including a binding between at least a portion of said financial account datum and said public key of said user using a cryptographic verification key associated with a trusted party performing said binding;

(b) verifying said binding using said cryptographic verification key or a key associated with said cryptographic verification key, thereby verifying said public key was bound using said cryptographic verification key by said trusted party that performed said binding; and (c) using said financial account datum to authorize said transaction order digitally signed by said user with said private key corresponding to said public key.

3. The method of claim 2 where said digital certificate constitutes said binding.

4. The method of claim 2 where said binding is embedded in said digital certificate.

5. The method of claim 2 where said financial account datum includes a credit card number.

6. The method of claim 2 where said financial account datum includes a debit card number.

7. The method of claim 2 where said financial account datum includes a PIN.

8. The method of claim 2 where said financial account datum includes a card verification value 2.

9. The method of claim 2 where said financial account datum includes checking account information.

10. The method of claim 2 where said binding is performed with a symmetric key shared between said trusted party and a party performing said verification step.

11. The method of claim 2 wherein said key associated with said second verification key comprises an asymmetric key, where said binding is performed with said asymmetric key.

12. The method of claim 2 where said binding is performed by an issuer of said digital certificate.

13. The method of claim 2 where said binding is performed by an issuer of said financial accounting datum.

14. The method of claim 2 where said digital certificate is protected with an access code known to said user.

15. The method of claim 2 where at least a portion of said financial account datum is kept confidential from said merchant.

16. A method for providing electronic payment capabilities to a user in a networked computer environment, comprising the steps of:

(a) obtaining a financial account datum associated with said user;

(b) obtaining a public key associated with said user;

(c) obtaining a cryptographically assured binding of said public key to at least a portion of said financial account datum using a cryptographic verification key associated with a trusted party performing said binding, (i) said financial account datum, said public key, and said binding being included in a digital certificate for said user, (ii) said digital certificate being usable by said user to conduct an electronic transaction involving said financial account datum; and (d) transmitting said digital certificate to said user, enabling said user to conduct said electronic transaction involving (i) a merchant, and (ii) a transaction processor capable of verifying said binding using said cryptographic verification key or a key associated with said cryptographic verification key, thereby verifying said public key was bound using said cryptographic verification key by said trusted party that performed said binding.

17. The method of claim 16 where said digital certificate constitutes said binding.

18. The method of claim 16 where said binding is embedded in said digital certificate.

19. The method of claim 16 where said financial account datum includes a credit card number.

20. The method of claim 16 where said financial account datum includes a debit card number.

21. The method of claim 16 where said financial account datum includes a PIN.

22. The method of claim 16 where said financial account datum includes a card verification value 2.

23. The method of claim 16 where said financial account datum includes checking account information.

24. The method of claim 16 where said binding is performed with a symmetric key shared between said trusted party and said transaction processor.

25. The method of claim 16 wherein said key associated with said second verification key comprises an asymmetric key, where said binding is performed with said asymmetric key.

26. The method of claim 16 where said binding is performed by an issuer of said digital certificate.

27. The method of claim 16 where said binding is performed by an issuer of said financial account information.

28. The method of claim 16 further comprising the step, after step (a), of verifying said financial account datum.

29. The method of claim 16 where said digital certificate is protected with an access code known to said user.

30. The method of claim 16 where said digital certificate is stored at a credential server accessible to said user.

31. The method of claim 16 where at least a portion of said financial account datum is kept confidential from said merchant.

32. An apparatus for authorizing an electronic purchase in a networked computer environment, comprising:

(a) a computer processor;

(b) a memory connected to said processor storing a program to control the operation of said processor;

(c) the processor operable with said program in said memory to:

(i) receive, from a merchant, a transaction authorization request, said request including a digital certificate passed through said merchant from a user involved in said transaction and a transaction order that was digitally signed by said user using a private key associated with a public key, (1) said digital certificate including a financial account datum associated with said user as well as said public key of said user, (2) said digital certificate also including a binding between at least a portion of said financial account datum and a public key of said user using a cryptographic verification key associated with a trusted party performing said binding;

(ii) verify said binding using said cryptographic verification key or a key associated with said cryptographic verification key, thereby verifying said public key was bound using said cryptographic verification key by said trusted party that performed said binding; and (iii) use said financial account datum to authorize a transaction order digitally signed by said user with said private key corresponding to said public key.

33. The apparatus of claim 32 where said financial account datum includes a PIN.

34. The apparatus of claim 32 where said financial account datum includes a card verification value 2.

35. The apparatus of claim 32 where said binding is performed with an asymmetric key corresponding to said cryptographic verification key.

36. The method of claim 32 where at least a portion of said financial account datum is kept confidential from said merchant.

37. An apparatus for providing electronic payment capabilities to a user in a networked computer environment, comprising:

(a) a processor, (b) a memory connected to said processor storing a program to control the operation of said processor;

(c) the processor operable with said program in said memory to:

(i) obtain a financial account datum regarding said user, (ii) obtain a public key associated with said user, (iii) obtain a cryptographically assured binding of said public key to at least a portion of said financial account datum using a cryptographic verification key associated with a trusted party performing said binding, (1) said financial account datum, said public key, and said binding being included in a digital certificate for said user, (2) said digital certificate being usable by said user to conduct an electronic transaction involving said financial account datum, and (iv) transmit said digital certificate to said user, enabling said user to conduct said electronic transaction involving (1) a merchant, and (2) a transaction processor capable of verifying said binding using said cryptographic verification key or a key associated with said cryptographic verification key, thereby verifying said public key was bound using said cryptographic verification key by said trusted party that performed said binding.

38. The apparatus of claim 37 where said financial account datum includes a PIN.

39. The apparatus of claim 37 where said financial account datum includes a card verification value 2.

40. The apparatus of claim 37 where said binding is performed with an asymmetric key corresponding to said cryptographic verification key.

41. The method of claim 37 where at least a portion of said financial account datum is kept confidential from said merchant.

42. A computer-readable storage medium encoded with processing instructions for implementing a method for authorizing an electronic purchase in a networked computer environment, said processing instructions for directing a computer to perform the steps of (a) receiving, from a merchant, a transaction authorization request, said request including a digital certificate passed through said merchant from a user involved in said transaction and a transaction order that was digitally signed by said user using a private key associated with a public key, (i) said digital certificate including a financial account datum associated with said user as well as a public key of said user, (ii) said digital certificate also including a binding between at least a portion of said financial account datum and a public key of said user using a cryptographic verification key associated with a trusted party performing said binding;

(b) verifying said binding using a cryptographic verification key or a key associated with said cryptographic verification key, thereby verifying said public key was bound using said cryptographic verification key by said trusted party that performed said binding; and (c) using said financial account datum to authorize said transaction order digitally signed by said user with said private key corresponding to said public key.

43. The computer-readable medium of claim 42 where said financial account datum includes a PIN.

44. The computer-readable medium of claim 42 where said financial account datum includes a card verification value 2.

45. The computer-readable medium of claim 42 where said binding is performed with an asymmetric key corresponding to said cryptographic verification key.

46. The method of claim 42 where at least a portion of said financial account datum is kept confidential from said merchant.

47. A computer-readable storage medium encoded with processing instructions for implementing a method for providing electronic payment capabilities to a user in a networked computer environment, said processing instructions for directing a computer to perform the steps of:

(a) obtaining a financial account datum regarding said user;

(b) obtaining a public key associated with said user;

(c) obtaining a cryptographically assured binding of said public key to at least a portion of said financial account datum using a cryptographic verification key associated with a trusted party performing said binding, (i) said financial account datum, said public key, and said binding being included in a digital certificate for said user, (ii) said digital certificate being usable by said user to conduct an electronic transaction involving said financial account datum; and (d) transmitting said digital certificate to said user, enabling said user to conduct said electronic transaction involving (i) a merchant, and (ii) a transaction processor capable of verifying said binding using aid cryptographic verification key or a key associated with said cryptographic verification key, thereby verifying said public key was bound using said cryptographic verification key by said trusted party that performed said binding.

48. The computer-readable medium of claim 47 where said financial account datum includes a PIN.

49. The computer-readable medium of claim 47 where said financial account datum includes a card verification value 2.

50. The computer-readable medium of claim 47 where said binding is performed with an asymmetric key corresponding to said cryptographic verification key.

51. The method of claim 47 where at least a portion of said financial account datum is kept confidential from said merchant.

* * * * *

UNITED STATES PATENT AND TRADEMARK OFFICE

CERTIFICATE OF CORRECTION

PATENT NO. : 6,895,391 B1
DATED : May 17, 2005
INVENTOR(S) : Kausik

It is certified that error appears in the above-identified patent and that said Letters Patent is hereby corrected as shown below:

Column 10,
Line 62, change “method” to -- apparatus --.

Column 11,
Line 35, change “method” to -- apparatus --.

Column 12,
Line 16, change “method” to -- computer-readable medium --.
Line 55, change “method” to -- computer-readable mediium --.

Signed and Sealed this

Eighteenth Day of April, 2006

JON W. DUDAS
*Director of the United States Patent and Trademark Office*